US009952977B2

United States Patent
Heinrich et al.

(10) Patent No.: US 9,952,977 B2
(45) Date of Patent: Apr. 24, 2018

(54) CACHE OPERATIONS AND POLICIES FOR A MULTI-THREADED CLIENT

(75) Inventors: Steven James Heinrich, Madison, AL (US); Alexander L. Minkin, Los Altos, CA (US); Brett W. Coon, San Jose, CA (US); Rajeshwaran Selvanesan, Milpitas, CA (US); Robert Steven Glanville, Cupertino, CA (US); Charles McCarver, Madison, AL (US); Anjana Rajendran, San Jose, CA (US); Stewart Glenn Carlton, Madison, AL (US); John R. Nickolls, Los Altos, CA (US); Brian Fahs, Los Altos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1157 days.

(21) Appl. No.: 12/890,476

(22) Filed: Sep. 24, 2010

(65) Prior Publication Data
US 2011/0078381 A1    Mar. 31, 2011

(51) Int. Cl.
G06F 12/00      (2006.01)
G06F 12/0842    (2016.01)
G06F 12/0897    (2016.01)

(52) U.S. Cl.
CPC ...... *G06F 12/0842* (2013.01); *G06F 12/0897* (2013.01)

(58) Field of Classification Search
None
See application file for complete search history.

(56) References Cited

U.S. PATENT DOCUMENTS

| | | | | |
|---|---|---|---|---|
| 5,513,353 | A * | 4/1996 | Fujimoto | |
| 2003/0093622 | A1 * | 5/2003 | Desota et al. | 711/129 |
| 2004/0155885 | A1 * | 8/2004 | Munshi et al. | 345/557 |
| 2008/0065832 | A1 * | 3/2008 | Srivastava et al. | 711/130 |
| 2009/0037661 | A1 * | 2/2009 | Fairhurst | 711/133 |
| 2009/0164733 | A1 * | 6/2009 | Kim | G06F 12/0897 711/133 |
| 2009/0172291 | A1 * | 7/2009 | Sprangle et al. | 711/134 |
| 2010/0191916 | A1 * | 7/2010 | Balakrishnan | G06F 12/0808 711/134 |
| 2011/0093654 | A1 * | 4/2011 | Roberts et al. | 711/105 |

* cited by examiner

*Primary Examiner* — Daniel D Tsui
(74) *Attorney, Agent, or Firm* — Artegis Law Group, LLP

(57) ABSTRACT

A method for managing a parallel cache hierarchy in a processing unit. The method including receiving an instruction that includes a cache operations modifier that identifies a level of the parallel cache hierarchy in which to cache data associated with the instruction; and implementing a cache replacement policy based on the cache operations modifier.

25 Claims, 8 Drawing Sheets

CACHE OPERATIONS AND POLICIES FOR A MULTI-THREADED CLIENT

CROSS-REFERENCE TO RELATED APPLICATIONS

This application claims benefit of U.S. provisional patent application Ser. No. 61/246,044, filed on Sep. 25, 2009.

BACKGROUND

Field of the Invention

Embodiments of the invention relate generally to multi-threaded processing and, more specifically, to cache operations and policies for a multi-threaded client.

Description of the Related Art

Conventional cache policy techniques attempt to determine a pattern of load and store operations in an effort to anticipate which data should be cached and/or evicted. However, in a highly multithreaded parallel processor, it can be extremely difficult to determine a pattern. For example, over 10,000 threads could be executing concurrently, making pattern detection difficult.

In addition, highly multithreaded parallel processors, such as graphics processing units (GPUs), have relatively small cache capacities per thread compared to serial processors such as CPU (central processing unit) cores.

Accordingly, what is needed in the art is a cache management technique that makes effective use of the limited caching capabilities of a multithreaded parallel processor.

SUMMARY

Embodiments of the invention provide an architecture that offers massively parallel threaded processors with multiple cache hierarchies. Strategies for making efficient use of the memory hierarchy are useful for high performance operation, especially to maximize utility of the caches closest to the processors. The L1 Cache Unit (also referred to as the "L1 cache" or simply "L1") includes a set-associative first level data cache with a number of operations and polices for that purpose. The L1 cache may service multiple clients, of which the primary one may be a multithreaded streaming multiprocessor (SPM). The SPM requests are combined from multiple parallel execution threads. Other clients may include an M-Pipe Controller (MPC) and a Primitive Engine (PE). Selected operations and polices are summarized below followed by a more detailed description, including (i) classification of allocation/replacement policies by request type and cache op, (ii) one-clock invalidate-all by type, and (iii) last-use invalidate-all.

One embodiment of the invention provides a method for managing a parallel cache hierarchy in a processing unit. The method including receiving an instruction that includes a cache operations modifier that identifies a level of the parallel cache hierarchy in which to cache data associated with the instruction; and implementing a cache replacement policy based on the cache operations modifier.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
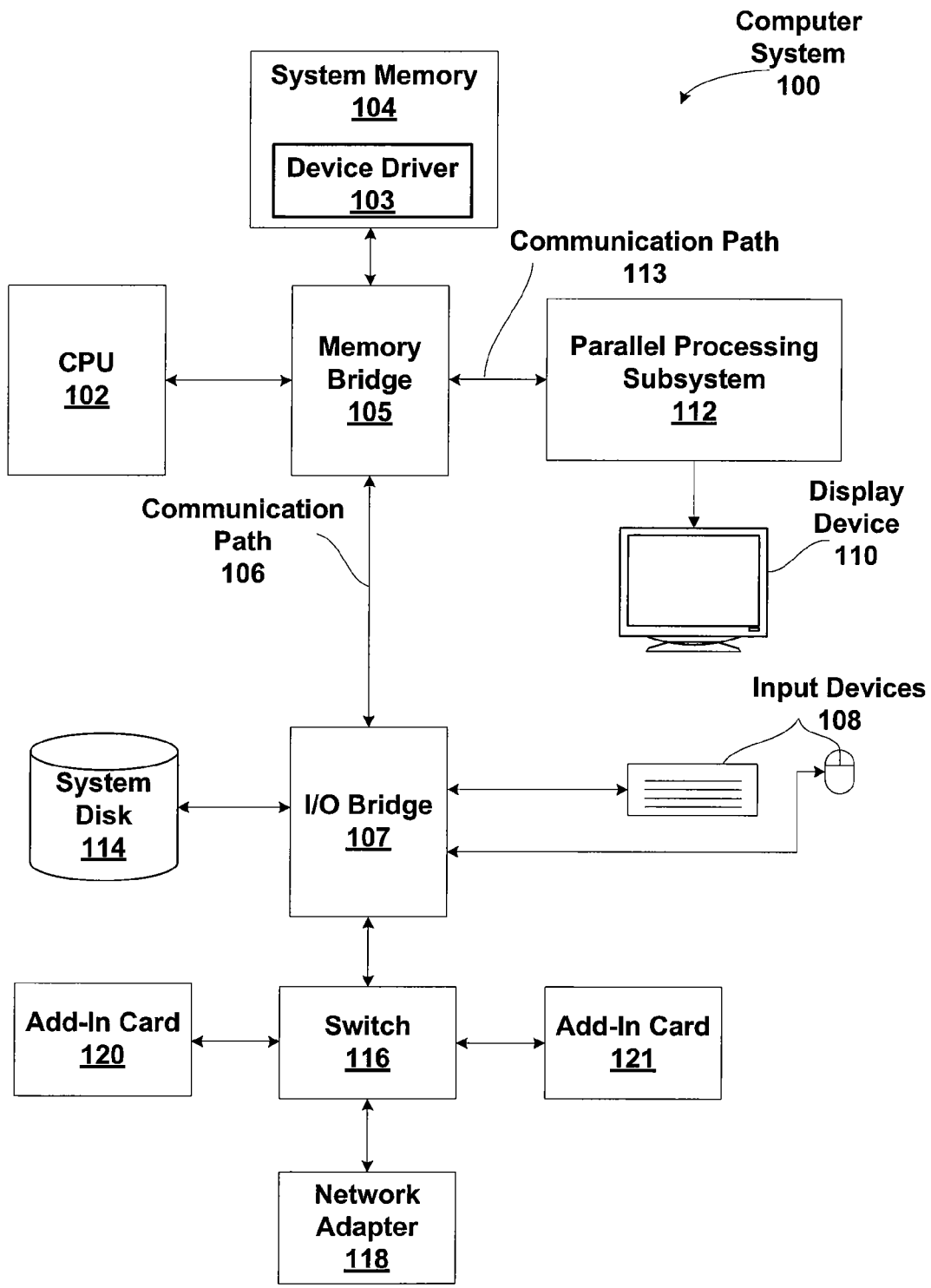
FIG. 1 is a block diagram illustrating a computer system configured to implement one or more aspects of the invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
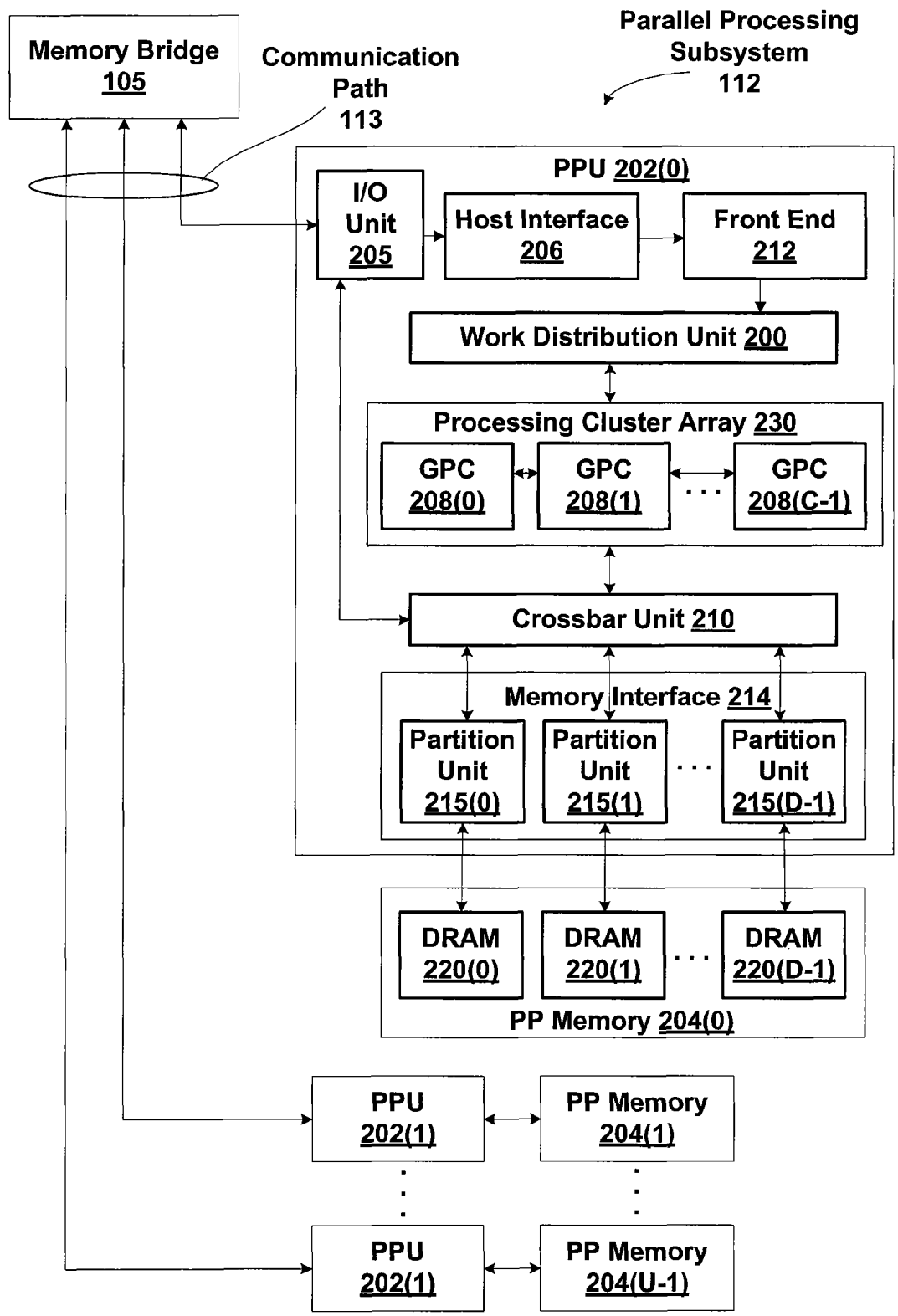
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
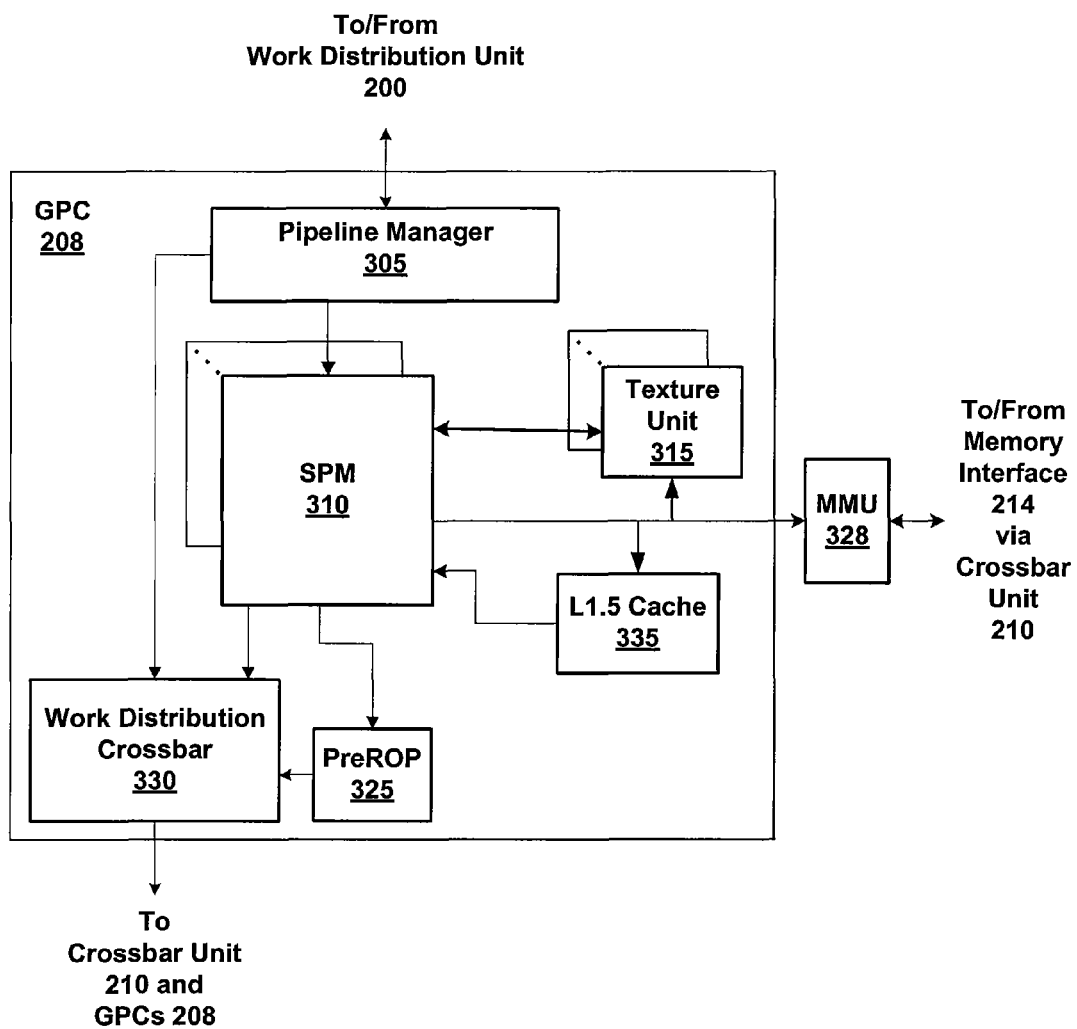
FIG. 3A is a block diagram of a GPC within one of the PPUs of FIG. 2, according to one embodiment of the invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
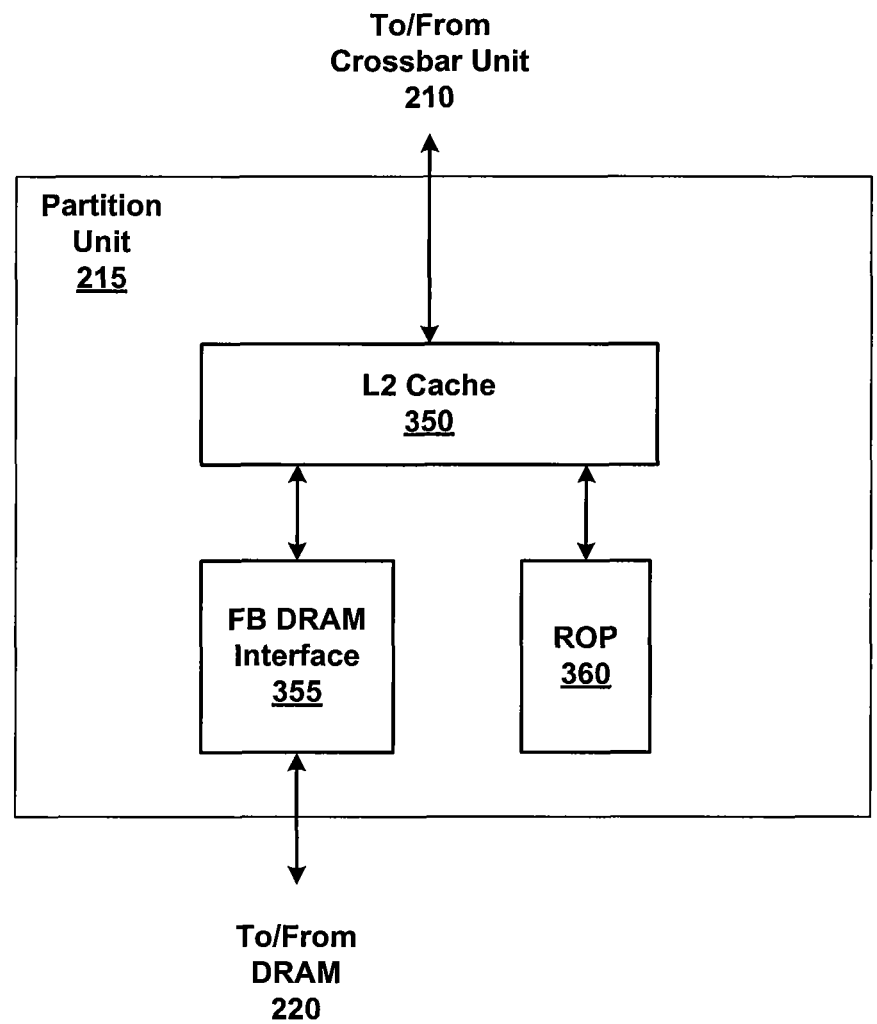
FIG. 3B is a block diagram of a partition unit within one of the PPUs of FIG. 2, according to one embodiment of the invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
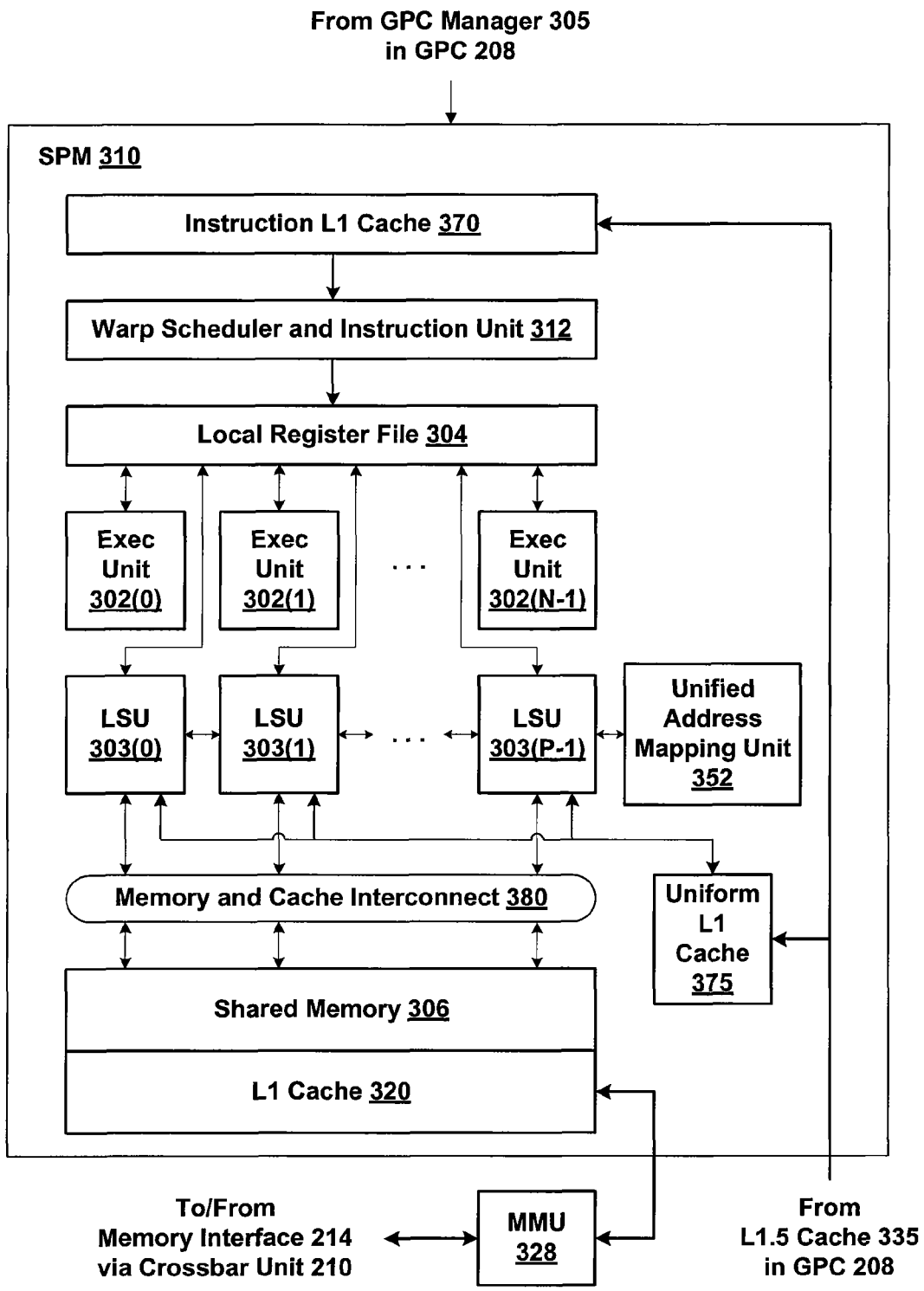
FIG. 3C is a block diagram of a portion of the SPM of FIG. 3A, according to one embodiment of the invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Figure 4:
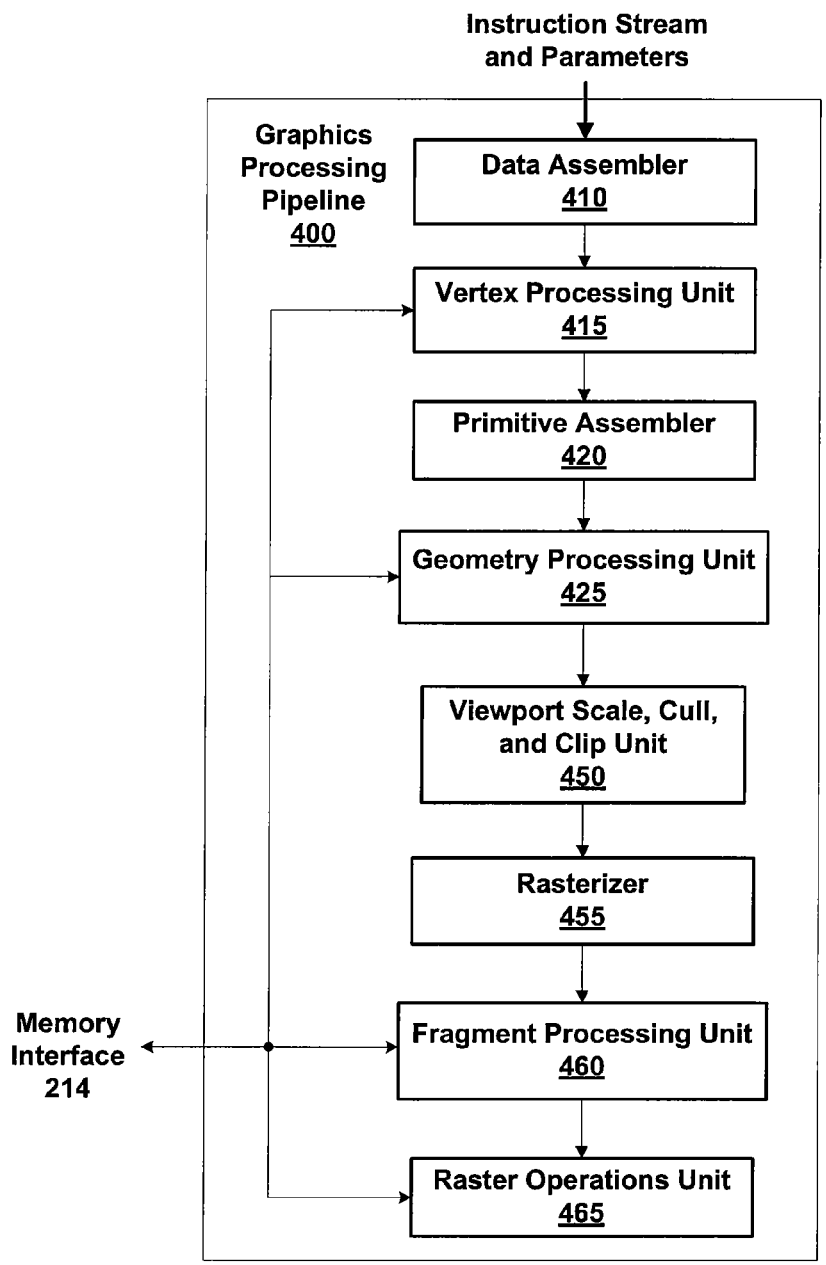
FIG. 4 is a conceptual diagram of a graphics processing pipeline that one or more of the PPUs of FIG. 2 can be configured to implement, according to one embodiment of the invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Cache Operations and Policies for a Multi-Threaded Client

Embodiments of the invention provide an architecture that offers massively parallel threaded processors with multiple cache hierarchies. Strategies for making efficient use of the memory hierarchy are useful for high performance operation, especially to maximize utility of the caches closest to the processors. The L1 Cache Unit (also referred to as the "L1 cache" or simply "L1") includes a set-associative first level data cache with a number of operations and polices for that purpose. The L1 cache may service multiple clients, of which the primary one may be a multithreaded streaming multiprocessor (SPM). The SPM requests are combined from multiple parallel execution threads. Other clients may include an M-Pipe Controller (MPC) and a Primitive Engine (PE).

Figure 5:
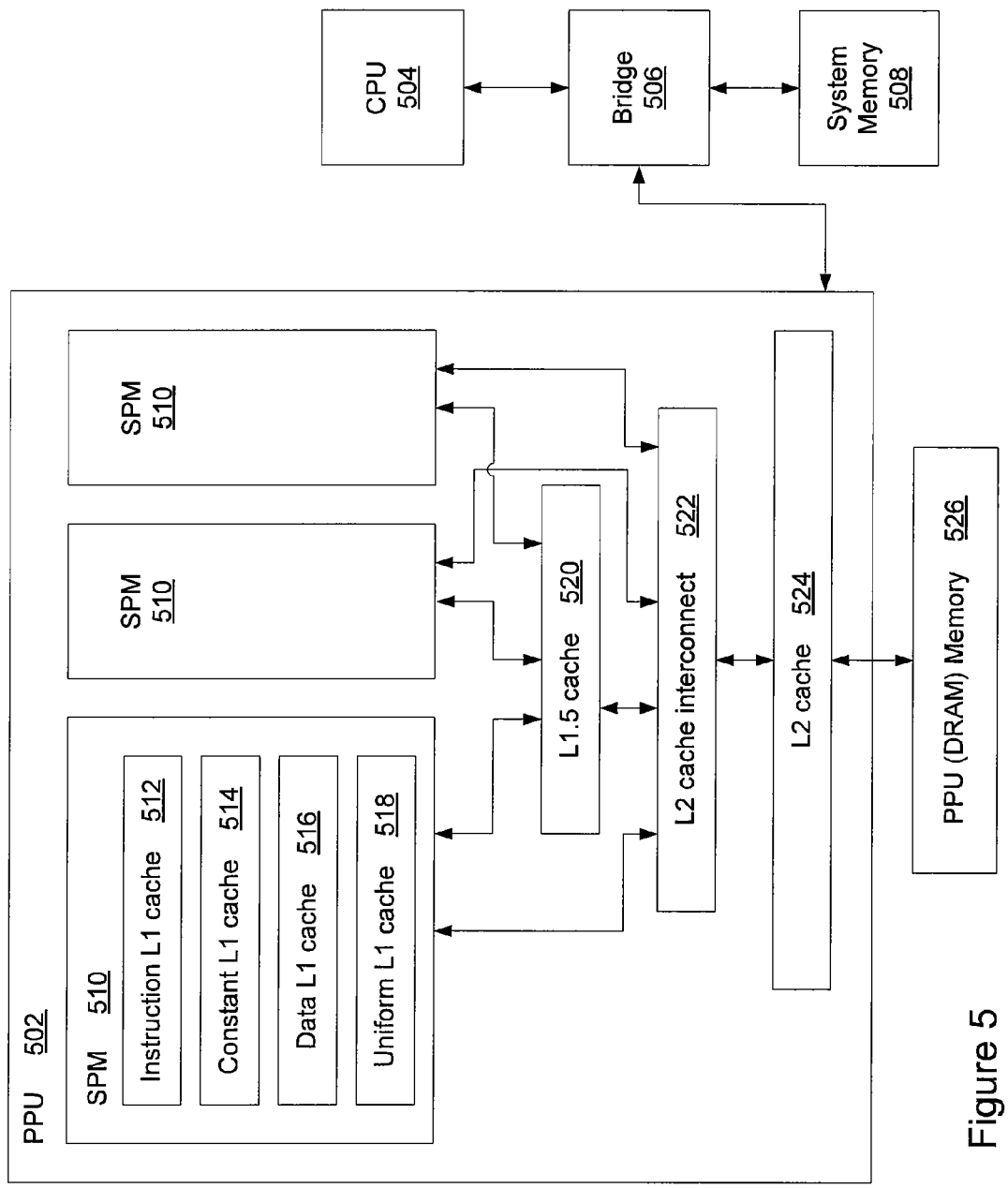
FIG. 5 is a conceptual diagram illustrating a parallel cache hierarchy in a parallel thread processor, according to one embodiment of the invention.

FIG. 5 is a conceptual diagram illustrating a parallel cache hierarchy in a parallel thread processor, according to one embodiment of the invention. As shown, a PPU 502 includes one or more SPMs 510. The PPU 502 is coupled to a PPU memory 526, which may comprise DRAM. The PPU 502 is also coupled to a bridge 506. The bridge 506 is coupled to a CPU 504 and a system memory 508. In one implementation, the PPU 502 is coupled to the CPU 504 and the system memory 508 via a PCI-Express link and the bridge 506.

As shown in FIG. 5, each SPM 510 includes an instruction L1 cache 512, a constant L1 cache 514, a data L1 cache 516, and/or a uniform L1 cache 518. The PPU also includes an L1.5 cache 520 coupled to each SPM 510. An L2 cache interconnect is coupled to each SPM 510, the L1.5 cache 520, and an L2 cache 524. The L2 cache 524 is coupled to the PPU memory 526.

In one embodiment, each PPU 502 is equivalent to PPU 202 shown in FIG. 2, and each SPM 510 is equivalent to SPM 310 shown in FIG. 3C. For example, the instruction L1 cache 512 is equivalent to the instruction L1 cache 370, the data L1 cache 516 is equivalent to the L1 cache 320, and the uniform L1 cache 518 is equivalent to the uniform L1 cache 375, as also shown in FIG. 3C. The L1.5 cache 520 may be equivalent to the L1.5 cache 335 shown in FIG. 3A. The L2 cache 524 may be equivalent to the L2 cache 330 shown in FIG. 3B.

The conceptual diagram illustrated in FIG. 5 shows just one implementation of a parallel cache hierarchy in a parallel thread processor architecture with a scalable number of thread processors called streaming multiprocessors (SPMs) 510. In one embodiment, a warp scheduler and instruction unit 312 also included in the SPM 510 provides instructions from parallel threads to the parallel execution units 302 and the parallel load-store units 303, as described in FIG. 3C.

In the embodiment shown in FIG. 5, each SPM 510 includes multiple different L1 caches: an L1 instruction cache 512, an L1 constant cache 514, an L1 data cache 516, and a uniform data L1 cache 518. The SPMs 510 and L1 caches share a unified L2 cache 524 via the cache interconnection network 522. In some embodiments, an additional cache layer is provided between the L1 caches and the L2 cache, i.e., the L1.5 cache 520.

The L2 cache 524 accesses the PPU DRAM memory 526, the system memory 508 via PCIe interface, and, optionally, additional peer device memory via the PCIe interface. An example of a peer device memory is the DRAM memory of another PPU attached to the same PCIe network.

The SPM load-store units (LSU) 303 (shown in FIG. 3C) execute memory access instructions including load, store, and cache control instructions listed below:

```
ld{.cop}.sz   rd, [ra + offset];    // load from memory
ldu.sz rd, [ra + offset];           // load via uniform cache
st{.cop}.sz   [ra + offset], rb;    // store to memory
cctl.cache.op  {rd,} [ra + offset]; // cache control operation
```

As used herein, the term "load" describes instructions that read and return a value from memory, while the term "store" describes instructions that write a value to memory. Some instructions, such as atomic and locking operations, modify memory and return values, and should be considered to have both load and store semantics, and, therefore, follow both load and store rules.

The load instruction and store instruction "cache operations" (.cop) are described below. The cache control instruction cctl is also described below.

Cache Operations for Load and Store Instructions

The load and store instructions read or write memory at the effective address specified by the address operand. The .sz suffix specifies the size in bytes to read or write in memory, and the SPM instruction set architecture (ISA) may support 1-, 2-, 4-, 8-, and 16-byte sizes for load/store instructions. The effective memory address is the sum of register ra plus the immediate offset in bytes.

```
ld{.cop}.sz   rd, [ra + offset];    // load rd from memory
st{.cop}.sz   [ra + offset], rb;    // store rb to memory
```

In some embodiments, the SPM 510 implements two versions of the memory access instructions using 32-bit addresses and 64-bit extended addresses designated with suffix .e (i.e., instructions ld.e and st.e).

Load Instruction Cache Operations ld.cop

Load instructions have optional cache operations specified by .cop that the compiler and/or programmer can use to optimize cache usage on accesses to the global memory space and to local per-thread private memory space. Global and local memory accesses can map to PPU (DRAM) memory 526, system memory 508, and PCIe device memory, depending on the virtual to physical address mapping provided by system software and the PPU memory management unit (MMU) page table. In one implementation, accesses to the shared memory RAM ignore the cache operation, but an implementation that caches the shared memory space can use the cache operation.

The optional cache operations on loads ld{.cop} and ld.e{.cop} are:

.ca   cache at all levels, likely to be accessed again (default)
.cg   cache at global level (cache in L2 and below, not L1)
.cs   cache streaming, likely to be accessed once, bypass cache or evict early
.lu   last use: if the address is a per-thread Local address and the cache line is fully covered (all data in the cache line is accessed by the threads of the warp), load, then invalidate the line and cancel any pending dirty writeback, else load, and mark the cache line as evict first. Same .cop encoding as .cs.
.cv   cache as volatile if address is in system memory; consider cached system memory lines stale, fetch again The default ld instruction cache operation is ld.ca, which allocates cache lines in all levels (L1 and L2) with normal eviction policy. In one embodiment, the application can use this instruction when the application expects to access the same cache line multiple times, and wants the accesses to hit in the working set of the L1 cache.

Global data is coherent at the L2 cache level, but in one implementation, the multiple L1 caches in each SPM are not coherent with each other for global data. If one thread stores to global memory via one L1 cache, and a second thread in a different SPM loads that address via a second L1 cache with ld.ca, the second thread may get stale L1 cache data, rather than the data stored by the first thread. The driver, therefore, invalidates global L1 cache lines between dependent grids of parallel threads. The program can also use the cache control instruction cctl to invalidate L1 cache lines, as described in greater detail below. Stores by the first grid program are then correctly fetched by the second grid program issuing default ld.ca loads cached in the L1 cache. This instruction supports alternate implementations that provide cache coherency among the multiple L1 caches. Alternatively, a program can bypass the L1 cache level with the ld.cg load cache global operation described below, to avoid fetching stale L1 data.

In one embodiment, the instruction ld.cg is used to cache loads only globally, bypassing the L1 cache and caching only at the global (L2 cache) level. An application program can use this instruction when it expects to read the address once, and reduces disruption of the working set in the relatively small L1 cache. This instruction enables communication between threads in different SPMs.

The ld.cs load cached streaming operation allocates global lines with evict-first policy in L1 and L2 to limit cache pollution by temporary streaming data that may be accessed once or twice. In another embodiment, the streaming data can bypass the L1 and L2 caches via a small stream cache or FIFO adjacent to each cache so that streaming data does not disturb the working set of L1 or L2. When ld.cs is applied to a local window address, it performs the ld.lu operation, described below.

The ld.lu load last use operation, when applied to a local private per-thread address, invalidates (i.e., discards and cancels any pending dirty writeback of the line if it is dirty from a prior store) the local L1 cache line following the load, if the line is fully covered (all the data in the cache line is read by the threads of the warp). The compiler and/or programmer may use ld.lu when restoring spilled registers and popping function stack frames to avoid needless writebacks of lines that will not be used again. The ld.lu instruction has the same cache operation .cop encoding as ld.cs, and performs a load cached streaming operation on global addresses.

The ld.cv load cached volatile operation applied to a global system memory address invalidates (i.e., discards) a matching L2 line and re-fetches the line on each new load, to allow the thread program to poll a system memory location written by the CPU.

A ld.cv applied to a PPU DRAM address is the same as ld.cs, evict-first, as shown in Table 1.

cache with write-back. However, in one embodiment, global store data in L1 is not cached because multiple L1 caches are not coherent for global data. Global stores bypass the L1 cache and discard any L1 cache lines that match, regardless of the .cop cache operation. Other embodiments may provide globally-coherent L1 caches and st.wb could writeback dirty global store data from the L1 cache.

In one embodiment shown in Table 2, if one thread stores to global memory, bypassing its L1 cache, and a second thread in a different SPM later loads from that address via a different L1 cache with ld.ca, the second thread may get a hit on stale L1 cache data, rather than get the data from L2 or memory stored by the first thread. Accordingly, the driver must invalidate global L1 cache lines between dependent grids of thread arrays. Stores by the first grid program are then correctly missed in the L1 cache and fetched by the second grid program issuing default ld.ca loads.

TABLE 1

| | LD.cop [global address] | | | | LD.cop [local address] | |
|---|---|---|---|---|---|---|
| .cop | L1 | L2 DRAM | L2 SysMem | .cop | L1 | L2 |
| .ca* | evict-norm | evict-norm | evict-norm | .ca* | evict-norm | evict-norm |
| .cg | non-cached [1] | evict-norm | evict-norm | .cg | evict-first | evict-norm |
| .cs | evict-first | evict-first | evict-first | .lu | last use [2] | evict-first |
| .cv | non-cached [1] | evict-first | fetch volatile [3] | .cv | evict-first | evict-first |

*Denotes default.
[1] L1 invalidates a matching line before a ld.cg or ld.cv. In this implementation, L1 is not coherent - it does not snoop global writes, so a matching L1 line may be stale. No record is left in L1 after a ld.cg or ld.cv.
[2] L1 will return local per-thread data and then invalidate the line and cancel a pending dirty writeback only if the line is fully covered (all its data is read by the threads of the warp); otherwise, it will return the line and leave it as evict-first.
[3] Load cache volatile ld.cv applied to System Memory invalidates a matching L2 line and re-fetches the line on each new load, to allow the thread program to poll a SysMem location written by the CPU. The L2 may coalesce a burst of loads to the same SysMem address. A ld.cv applied to a frame buffer DRAM address is the same as ld.cs, evict-first.

Store Instruction Cache Operations st.cop

Store instructions, similar to the load instructions described above, have optional cache operations specified by .cop that the compiler and programmer can use to optimize cache usage on accesses to the global memory space and to local per-thread private memory space.

The optional cache operations on stores st{.cop} and st.e{.cop} are:

| | |
|---|---|
| .wb | write back all coherent levels (default) |
| .cg | cache at global level (cache in L2 and below, not L1) |
| .cs | cache streaming, likely written once (bypass cache or evict early) |
| .wt | cache write-through (for addresses in system memory) |

In one embodiment, cache operations are ignored on shared memory when the shared memory is implemented as a RAM. Cache operations to local memory may have different meanings than those for global memory.

The default st generic store cache operation is store write-back st.wb, which writes back cache lines of coherent cache levels with normal eviction policy. Data stored to local per-thread memory is cached in the L1 cache and the L2

The cache operation st.cg cache-global can be used to cache global store data only globally, bypassing the L1 cache, and cache only in the L2 cache. In one implementation shown in Table 2, the st.cg cache global policy is also used for the st.wb instruction for global data, but st.cg to local memory uses the L1 cache, and marks local L1 lines evict-first.

The st.cs store cached-streaming operation allocates cache lines with evict-first policy in the L2 cache (and the L1 cache if local) to limit cache pollution by streaming output data; global streaming data bypasses the L1. Since programs issue streaming writes once, another implementation of st.cs is to have streaming data bypass the L1 and L2 caches via a small stream cache or FIFO adjacent to each cache, so that streaming data does not disturb the working set of the L1 cache or the L2 cache.

The st.wt store write-through operation applied to a global system memory address writes through the L2 cache, to allow a CPU program to poll a system memory location written by the PPU with st.wt. In one implementation, addresses not in system memory use normal L2 write-back.

One embodiment of store instruction cache operations uses the cache operation policies shown in Table 2.

TABLE 2

| | ST.cop [Global address] | | | | ST.cop [Local address] | |
|---|---|---|---|---|---|---|
| .cop | L1 | L2 DRAM | L2 SysMem | .cop | L1 | L2 |
| .wb* | non-cached [1] | evict-norm | evict-norm | .WB* | evict-norm | evict-norm |
| .cg | non-cached [1] | evict-norm | evict-norm | .CG | evict-first | evict-norm |

TABLE 2-continued

| | ST.cop [Global address] | | | ST.cop [Local address] | | |
|---|---|---|---|---|---|---|
| .cop | L1 | L2 DRAM | L2 SysMem | .cop | L1 | L2 |
| .cs | non-cached [1] | evict-first | evict-first | .CS | evict-first | evict-first |
| .wt | non-cached [1] | evict-first | write-through [2] | .WT | evict-first | evict-first |

*Denotes default.

[1] In this embodiment, global data stores bypass the L1. L1 does not cache global store data; it does cache local per-thread data. L1 discards a matching global line before a ST to global, because global L1 lines cannot be dirty. L1 is not globally coherent - it does not snoop global stores, so a matching L1 line may be stale. No record is left in L1 after a ST to global.

[2] Store Write-Through (st.wt) applied to global System Memory writes through the L2 cache line to System Memory, to allow the CPU to poll a SysMem location written by the GPU with st.wt. The L2 does not coalesce a burst of write-through stores to the same SysMem address; it writes each one through to SysMem. A st.wt applied to a PPU memory (204) frame buffer DRAM address is the same as st.cs, streaming evict-first, write-back.

Selected operations and polices are summarized below followed by a more detailed description:

1. Classification of allocation/replacement policies by request type and cache op
2. One-clock invalidate-all by type
3. Last-use invalidate-all 1. Classification of Allocation/Replacement Policies by Request Type and Cache Op As described, the cache policies within the L1 cache are controlled by request type and a cache operation modifier (.cop) sent with the request. The .cop field may be set to assist compiler or manual cache use optimizations as well as to provide directives for correct program behavior. The .cop modifier is defined in the Instruction Set Architecture (ISA) for load and store requests. Among other system wide effects, the request type and .cop modifier control the following in the L1 cache:

Separate allocation/replacement of streaming ways (evict-first) vs. non-streaming ways (evict-normal)
Transient ways for uncached operations
Reconfigurable limits on cache line use The use of data through the L1 cache may be classified as access-once (also referred to as "streaming"), access-many times (also referred to as "non-streaming"), or access-volatile. Streaming data is typically accessed a minimal number of times. For example, each SIMT (single-instruction, multiple-thread) execution thread may accesses a buffer once, but due to alignment of the buffer, an L1 cache line containing data from that buffer may be accessed twice over a short period of time. Non-streaming data may be expected to be resident in the L1 cache for multiple accesses over a longer period of time. Still other data may be subject to non-coherent accesses in a different channel, e.g., system memory used for CPU/GPU communication, and should not be cached at any level where accesses are not coherent. To control streaming vs. non-streaming data use, the L1 cache tracks allocation and replacement separately according to two different policies: evict-first for streaming, and evict-normal for non-streaming. To control volatile use, the data is not cached in L1, and L1 cache propagates a flag for subsequent interpretation by a Memory Management Unit (MMU) and the L2 cache.

In some embodiments, the L1 cache comprises a reconfigurable set-associative cache. Within each cache set, limits may be placed to control how much data of various types may occupy that particular cache set. For example, the amount of streaming vs. non-streaming data is controlled by a static register value, STREAMING_CNT. Cache line allocation and replacement decisions are made separately based on the previous history of use within the cache line and the current request classification. The algorithm is described in greater detail below.

A straight-forward cache replacement policy that supports pseudo-least-recently-used (pLRU) for arbitrary associativities and also has support for streaming requests can be implemented with one bit of state per cache tag to indicate that this tag was recently used. The pLRU algorithm sets the per-tag state bit each time the tag is accessed (either for a cache read or write/fill). If setting the bit causes all ways in the current index to be marked as accessed, the bits for the other ways are cleared. When it is time to choose a way for replacement, one of the ways whose access bit is cleared is selected, since these ways were not recently used. Note that the line must additionally be available to be selected for replacement, meaning it does not have pending operations on it. Note also that immediately after these state bits are reset there is only one way marked as recently-accessed, causing the algorithm to perform as not-most-recently-used. But as other ways are accessed, more information is collected and replacements will more accurately approximate least-recently-used.

In another embodiment, if setting the access bit causes all ways in the current index to be marked as accessed, all such bits may be cleared. This removes bias from the cache replacement.

Note that the 1-bit of pLRU state per cache tag need not be a dedicated bit of storage, but rather it may be encoded with other states also maintained per cache tag.

To support streaming vs. non-streaming cache lines, the ways within a set of the cache are partitioned by STREAMING_CNT. The ways within a set indexed from 0 up to a value determined from STREAMING_CNT are streaming ways, and the remaining ways are non-streaming. The pLRU algorithm described above is applied separately to the streaming and the non-streaming ways. When a new cache line is needed, preference may be given to one that is not currently valid. According to various embodiments, requests considered streaming may give strong preference or the strict requirement to only re-use streaming ways. Requests considered non-streaming give preference to using non-streaming ways but use streaming ways if needed.

In addition to streaming vs. non-streaming, there are also limits to control the amount of uncached data within a set. The L1 cache tags and RAMs are used as a conduit for uncached data to save silicon area. However, doing so risks evicting access-many cache lines. Additional controls are placed to limit the use of how many cache ways within a set may be used for uncached data via UNCACHED_LD_CNT and GLOBAL_ATOM_CNT.

In one embodiment, these limits are controlled via static registers. Other embodiments may allow for more dynamic behavior by defining these limits more appropriate to specific shader program behavior in the shader program header (SPH) or by making dynamic decisions based on the current state of the ways within a set and the request type and .cop modifier for which a new allocation is needed.

Figure 6:
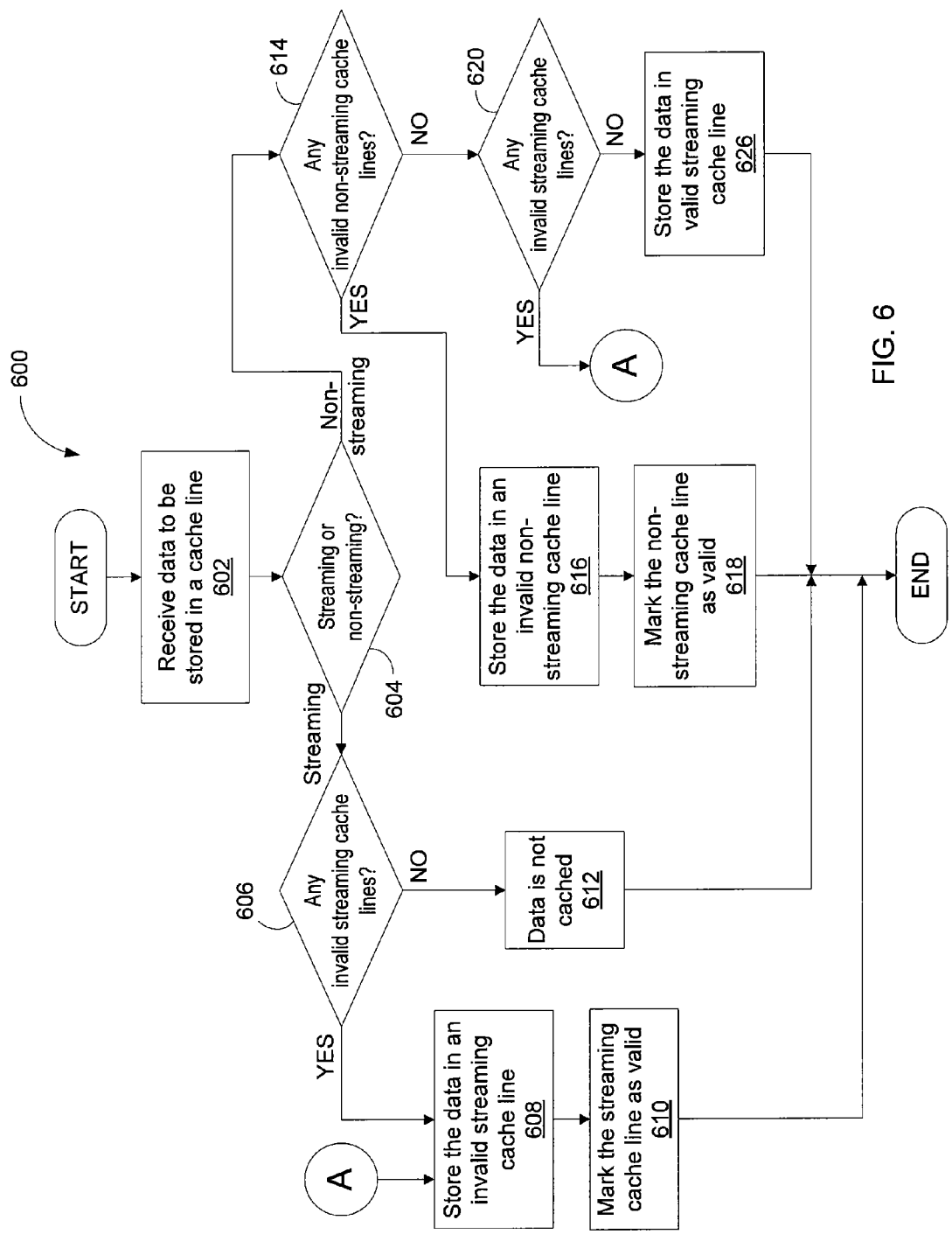
FIG. 6 is a flow diagram of method steps for implementing a cache line replacement policy, according to one embodiment of the invention.

FIG. 6 is a flow diagram of method steps for implementing a cache line replacement policy, according to one embodiment of the invention. Persons skilled in the art will understand that, even though the method 600 is described in conjunction with the systems of FIGS. 1-5, any system configured to perform the method steps, in any order, is within the scope of embodiments of the invention.

As shown, the method 600 begins at step 602, where a cache controller receives data to be stored in a cache line. At step 604, the controller determines whether the data is streaming data or non-streaming data. As described above, streaming data is typically accessed only once or twice, while non-streaming data may be accessed many times. Data can be marked as either streaming or non-streaming using the cache operations (.cop) described above.

If the controller determines that the data is streaming data, then the method 600 proceeds to step 606. At step 606, the controller determines whether any streaming cache lines are marked as "invalid." As described above, a pseudo-LRU replacement policy may be implemented with one bit per tag that is updated each time a tag is accessed. Also as described, a portion of the available cache lines may be allocated for "streaming" use and another portion may be allocated for "non-streaming" use. For example, one of six ways in a set may be allocated for streaming use, while five ways are allocated for non-streaming use. In other examples, two of six or all six ways may be allocated for streaming use.

If the controller determines that at least one streaming cache line is marked as "invalid," then the method 600 proceeds to step 608, where the controller causes the data to be stored in an invalid streaming cache line. At step 610, the controller marks the streaming cache line as valid.

If, at step 606, the controller determines that none of the streaming cache lines are marked as "invalid," then the method 600 proceeds to step 612, where the controller does not cache the data. Accordingly, in one embodiment, streaming data is cached only in cache lines allocated for streaming use. In other embodiments, some streaming data may be cached in cache lines allocated for non-streaming use, with a strong preference to cache the data in the cache lines allocated for streaming use.

If, at step 604, the controller determines that the data is non-streaming data, then the method 600 proceeds to step 614. At step 614, the controller determines whether any non-streaming cache lines are marked as "invalid." If the controller determines that at least one non-streaming cache line is marked as "invalid," then the method 600 proceeds to step 616, where the controller causes the data to be stored in an invalid non-streaming cache line. At step 618, the controller marks the non-streaming cache line as valid.

If, at step 614, the controller determines that none of the non-streaming cache lines are marked as "invalid," then the method 600 proceeds to step 620, where the controller determines whether any streaming cache lines are marked as "invalid." If the controller determines that at least one streaming cache line is marked as "invalid," then the method 600 proceeds to step 608, described above. If, at step 620, the controller determines that none of the streaming cache lines are marked as "invalid," then the method 600 proceeds to step 626, where the controller causes the data to be stored in a valid streaming cache line. Accordingly, in one embodiment, non-streaming data is preferably stored in invalid non-streaming cache lines. If none of the non-streaming cache lines are invalid, then the controller attempts to store the data in an invalid streaming cache line. If none of the streaming cache lines are invalid, then the controller store the data in a valid streaming cache line.

2. One-Clock Invalidate-All by Type

L1 cache tags track two main data storage types: global and local, where local includes thread local memory and call-return stack (CRS) records. Storage within a cache line is mutually exclusive between these two types: a cache line is considered either global or local. State is maintained across the cache and per cache line in such a way that all valid cache lines of one of the types may be invalidated in one clock. The process of invalidating all the cache lines of a given type after optionally flushing dirty data to memory is called "invalidate-all." In cases where interleaved streams of work are launched and it is desired to ensure all prior results are flushed to memory and potentially stale references are invalidated, the efficiency of the invalidate-all operation allows operations for one stream minimally to affect the others. In order for the one-clock invalidate to proceed, all cache lines for that type need to be clean and idle (i.e., no requests are pending all of them).

Accordingly, the valid-idle-clean state for global cache lines is maintained separately from the valid-idle-clean state for local cache lines. This state must also be accessible for a parallel search across all lines maintained in the cache, and if appropriate conditions are true, a one-clock parallel reset of the lines to a non-valid state. This process may be assisted by the use counters for the number of pending operations or dirty cache lines of a given type. If the one-clock invalidate conditions are not true, then an ordered examination of the state associated with a given type is required. In one implementation, by visiting each set in turn, embodiments of the invention examine the ways within that set in parallel to wait for any pending operations to finish, and if requested, schedule the flush to memory of any dirty cache lines before moving on to the next set.

While the L1 cache may be servicing an invalidate-all operation from one SPM thread or non-SPM client, other threads from SPM or other non-SPM clients may continue to issue requests to the L1 cache. In order to satisfy the invalidate-all condition, the L1 cache can temporarily stall the non-SPM clients should they issue requests that interfere with the invalidate-all. The L1 cache treats SPM differently by sending it hints to SPM to guide which request types are preferable during the invalidate-all. A request that would interfere with the invalidate-all is deferred by L1 must be reschedule later by SPM. This non-blocking behavior still allows the L1 cache to service non-interfering requests.

3. Last-Use Invalidate-All

In one embodiment, one of the strategies used to improve performance is to invalidate a cache line after the last use of a fully covered load. In one embodiment, last-use invalidate is implemented by the cooperation of either compiler or manual program analysis and hardware detection.

Static program analysis can determine the last use of data as it is read from the L1 cache. For example, values held in registers close to the processors may be temporarily spilled to memory through the L1 cache and subsequently retrieved at the direction of the compiler or manual optimization process. This spill data may stay resident and dirty in L1 or itself be flushed to the next level of memory hierarchy. When this data is returned to the processors, it may be read once and returned, as opposed to a read-many usage. The read-once versus read-many distinction manifests itself into Instruction Set Architecture (ISA) design, L1 cache line allocation and replacement policies, and propagates to policies used in the L2 (second level cache) as well. Identifying and acting upon the case of last-use is a further enhancement in that effort.

However, static program analysis may not factor in dynamic runtime behaviors. In one embodiment, the architecture employs single-instruction, multiple-thread (SIMT) processing. For example, a set of up to 32 threads may be collected into a common processing unit called a warp. The active threads within a warp execute a common instruction with independent addresses and data. The path from the SPM to the L1 cache includes 32 request lanes. This arrangement can lead to various conditions where not all request lanes for a current request are valid, or where only the partial width of a lane is valid, as highlighted, but not restricted to, the following examples:

Address divergence due to the requested address space of a warp exceeding the size represented by a request to L1 and/or mapping to strict subsets of multiple cache lines.

Branch divergence due to valid threads within a warp taking different control paths.

Predication where independent thread state may cause conditional instruction execution.

Threads from when the warp was launched may terminate independently and may be no longer active, or threads that were never initially launched with the thread. This special case can be further exploited as will be described later.

A request with operand sizes less than the full lane width and mapping to less than a full cache line.

As described, the ISA for load requests allows a cache operation (.cop) flag. Through compiler or manual analysis, a load request to the L1 cache may be flagged with a .cop to indicate the last use of data, after which point the data is considered "dead." To compensate for the dynamic conditions listed above, the L1 cache detects when a last-use load request fully covers the cache line, where in the current embodiment "fully covered" means the full width of all 32 lanes to L1 are valid and map to the same cache line. When a fully-covered last-use read is identified, the cache line holding the requested data is invalidated after the data is returned, regardless of hit/miss/clean/dirty status of that line. This eliminates the need to subsequently flush dead dirty cache lines from L1, which would otherwise consume scheduling and resources within L1 and L2, the interconnection between L1 and L2, etc. This also marks a dead, but clean, cache line as invalid, which benefits an allocation policy that gives priority to invalid lines over valid but clean lines.

If a thread was never launched with a warp, or if a thread was launched but subsequently terminated, then any data associated with that thread is dead for the remaining lifetime of that warp. If the data of inactive threads is no longer relevant, an embodiment may consider such inactive threads as contributing to fully covered (or not) such that is maximizes the optimization benefit. For the case of a last-use read, such threads may be counted as fully covered.

Another embodiment may extend the notion of fully covered. First, since for graphics in processing pixel data, there may be a spatial coherence among a 2-by-2 group of thread within a warp. Some processing operations rely on the spatial coherence within the 2-by-2 group such that results are generated for all four threads if at least one thread was active when the warp started and as long as at least one thread continues to remain active. Even though a thread was may never have been active or was active and subsequently killed, it is promoted to active for certain operations to maintain spatially consistent data for the 2-by-2 group. This extends to local memory operations, where threads are promoted to active within a 2-by-2 before spilling and filling register data. Second, an embodiment may use the notion of fully covered or not to simplify store processing. Specifically, an embodiment may choose to treat a local store miss that is partially covered (for address or branch divergence, predication, or small operand size) as not cached. This avoids the need to fetch backing fill data from L2 and merge it with the partially covered store data in L1 and can result in silicon area savings.

The first embodiment takes a conservative approach. The idea may be extending in many ways. For example, call-return stack (CRS) records are typically accessed through "push" and "pop" operations, and this may result in sequential runs of local ascending and descending memory accesses. A last-use operation could be triggered when the last CRS record is popped from a cache line. Last-use could apply to a push as well, triggering a last-use flush and/or clean operation when the last remaining record in a cached line is filled. This technique or sequential or last participating use could encompass more than just CRS records. Another example is that a cache that implements sectors within a cache line could trigger last-use operations within a sector.

In sum, embodiments of the invention provide an architecture that offers massively parallel threaded processors with multiple cache hierarchies. Strategies for making efficient use of the memory hierarchy are useful for high performance operation, especially to maximize utility of the caches closest to the processors. The L1 Cache Unit (also referred to as the "L1 cache" or simply "L1") includes a set-associative first level data cache with a number of operations and polices for that purpose. The L1 cache may service multiple clients, of which the primary one may be a multithreaded streaming multiprocessor (SPM). The SPM requests are combined from multiple parallel execution threads. Other clients may include an M-Pipe Controller (MPC) and a Primitive Engine (PE). Selected operations and polices are summarized below followed by a more detailed description, including (i) classification of allocation/replacement policies by request type and cache op, (ii) one-clock invalidate-all by type, and (iii) last-use invalidate-all.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method implemented on a computer for managing a parallel cache hierarchy in a processor, the method comprising:
   receiving an instruction that includes a cache operations modifier that identifies a first level of the parallel cache hierarchy in which to cache data associated with the instruction;
   selecting a first cache replacement policy from among a plurality of cache replacement policies, wherein the first cache replacement policy is selected based on whether the instruction comprises a load instruction or a store instruction; and
   executing the instruction and performing at least one related cache operation within the first level of the parallel cache hierarchy according to the first cache replacement policy.

2. The method of claim 1, wherein a first portion of the first cache memory in the parallel cache hierarchy is allocated for storing streaming data, and a second portion of the first cache memory is allocated for storing non-streaming data.

3. The method of claim 2, wherein the instruction is associated with streaming data, and the streaming data is stored in the first portion of the first cache memory when at least one cache line in the first portion of the first cache memory is marked as invalid.

4. The method of claim 2, wherein the instruction is associated with non-stream ing data.

5. The method of claim 4, wherein the non-streaming data is stored in the second portion of the first cache memory when at least one cache line in the second portion of the first cache memory is marked as invalid.

6. The method of claim 4, wherein the non-streaming data is stored in the first portion of the first cache memory when none of the cache lines in the second portion of the first cache memory is marked as invalid, and at least one cache line in the first portion of the first cache memory is marked as invalid.

7. The method of claim 4, wherein the non-streaming data is stored in the first portion of the first cache memory when none of the cache lines in either the first portion of the first cache memory or the second portion of the first cache memory is marked as invalid.

8. The method of claim 1, wherein cache tags associated with the first cache memory are either global or local, and the first cache replacement policy results in all valid cache lines having global cache tags being invalidated in one clock cycle and/or all valid cache lines having local cache tags being invalidated in one clock cycle.

9. The method of claim 1, wherein the cache operations modifier is associated with a fully covered load instruction, and the first cache replacement policy results in a cache line being invalidated after a last use of the fully covered load instruction.

10. The method of claim 1, wherein the processor comprises a graphics processing unit.

11. The method of claim 1, wherein the first cache replacement policy specifies a first policy with respect to a first cache memory and a second policy with respect to a second cache memory.

12. The method of claim 11, wherein the first policy is different from the second policy.

13. The method of claim 11, wherein the first cache memory comprises a level one cache memory and the second cache memory comprises a level two cache memory.

14. The method of claim 1, wherein the instruction comprises a load instruction and wherein selecting the first cache replacement policy comprises selecting from among an evict normal, an evict first, a non-cached, a fetch volatile, and a last use cache replacement policy.

15. The method of claim 1, wherein the instruction comprises a store instruction and wherein selecting the first cache replacement policy comprises selecting from among an evict normal, an evict first, a non-cached, and a write-through cache replacement policy.

16. A system for managing a parallel cache hierarchy, the system comprising:
   a processor, configured to:
      receive an instruction that includes a cache operations modifier that identifies a first level of the parallel cache hierarchy in which to cache data associated with the instruction,
      select a first cache replacement policy from among a plurality of cache replacement policies, wherein the first cache replacement policy is selected based on the cache operations modifier and based on whether the instruction comprises a load instruction or a store instruction; and
      execute the instruction and performing at least one related cache operation within the first level of the parallel cache hierarchy according to the first cache replacement policy.

17. The system of claim 16, wherein a first portion of the first cache memory in the parallel cache hierarchy is allocated for storing streaming data, and a second portion of the first cache memory is allocated for storing non-streaming data.

18. The system of claim 17, wherein the instruction is associated with streaming data, and the streaming data is stored in the first portion of the first cache memory when at least one cache line in the first portion of the first cache memory is marked as invalid.

19. The system of claim 17, wherein the instruction is associated with non-stream ing data.

20. The system of claim 19, wherein the non-streaming data is stored in the second portion of the first cache memory when at least one cache line in the second portion of the first cache memory is marked as invalid.

21. The system of claim 19, wherein the non-streaming data is stored in the first portion of the first cache memory when none of the cache lines in the second portion of the first cache memory is marked as invalid, and at least one cache line in the first portion of the first cache memory is marked as invalid.

22. The system of claim 19, wherein the non-streaming data is stored in the first portion of the first cache memory when none of the cache lines in either the first portion of the first cache memory or the second portion of the first cache memory is marked as invalid.

23. The system of claim 16, wherein cache tags associated with the first cache memory are either global or local, and the first cache replacement policy results in all valid cache lines having global cache tags being invalidated in one clock cycle and/or all valid cache lines having local cache tags being invalidated in one clock cycle.

24. The system of claim 16, wherein the cache operations modifier is associated with a fully covered load instruction, and the first cache replacement policy results in a cache line being invalidated after a last use of the fully covered load instruction.

25. The system of claim 16, wherein the processor comprises a graphics processing unit.

\* \* \* \* \*

UNITED STATES PATENT AND TRADEMARK OFFICE
CERTIFICATE OF CORRECTION

PATENT NO.        : 9,952,977 B2
APPLICATION NO.   : 12/890476
DATED             : April 24, 2018
INVENTOR(S)       : Steven James Heinrich et al.

It is certified that error appears in the above-identified patent and that said Letters Patent is hereby corrected as shown below:

On the Title Page

Please insert --Related U.S. Application Data
(60) Provisional application No. 61/246,044, filed on Sep. 25, 2009.--;

In the Claims

Column 23, Claim 4, Line 30, please delete "non-stream ing" and insert --non-streaming--;

Column 24, Claim 19, Line 41, please delete "non-stream ing" and insert --non-streaming--.

Signed and Sealed this
Tenth Day of July, 2018

Andrei Iancu
*Director of the United States Patent and Trademark Office*